United States Patent [19]

Schiff

[11] Patent Number: 4,815,689
[45] Date of Patent: Mar. 28, 1989

[54] AUTOMOBILE MIRROR

[76] Inventor: Robert D. Schiff, 3337 Tareco Dr., Los Angeles, Calif. 90068

[21] Appl. No.: 57,767

[22] Filed: Jun. 3, 1987

[51] Int. Cl.$^4$ ............................................. B60R 1/08
[52] U.S. Cl. .................................... 248/481; 350/626; 350/632
[58] Field of Search ...................... 248/475.1, 476, 481, 248/479, 482, 484, 485, 288.3; 350/612, 615, 617, 618, 621, 626, 631, 632, 636, 639, 604

[56] References Cited

U.S. PATENT DOCUMENTS

| | | | |
|---|---|---|---|
| 1,386,959 | 8/1921 | Severance | 248/288.3 |
| 1,455,441 | 5/1923 | Hodny | 248/484 |
| 1,498,432 | 6/1924 | Bosler | 350/621 |
| 1,607,163 | 11/1926 | Kinter | 350/621 |
| 2,210,147 | 8/1940 | Griffith | 350/626 |
| 2,802,394 | 8/1957 | Krone | 350/615 |
| 2,999,427 | 9/1961 | Newcomb | 350/612 |
| 3,644,021 | 2/1972 | Hamby | 350/615 |
| 4,345,819 | 8/1982 | Villa-Real | 350/626 |
| 4,439,013 | 3/1984 | Hagn | 350/631 |
| 4,695,138 | 9/1987 | Epstein | 350/626 |

FOREIGN PATENT DOCUMENTS

| | | | |
|---|---|---|---|
| 28860 | 5/1981 | European Pat. Off. | 350/626 |
| 2751878 | 5/1979 | Fed. Rep. of Germany | 350/626 |
| 2838525 | 3/1980 | Fed. Rep. of Germany | 350/626 |
| 378068 | 9/1907 | France | 350/626 |
| 1196181 | 11/1959 | France | 350/626 |
| 502001 | 11/1954 | Italy | 248/482 |
| 147962 | 9/1931 | Switzerland | 350/626 |
| 649008 | 1/1951 | United Kingdom | 350/615 |
| 776493 | 6/1957 | United Kingdom | 350/626 |

Primary Examiner—J. Franklin Foss
Assistant Examiner—Robert A. Olson
Attorney, Agent, or Firm—Robert L. Finkel

[57] ABSTRACT

A side-mounted rear view mirror for automobiles is formed by mounting a pair of component mirrors, rigidly supported in close side-by-side relationship with their reflective surfaces lying in a common plane, to the door, or directly to the frame of the vehicle, adjacent the driver's or passenger's side window. The mounting means position one of the component mirrors outside the vehicle and the other inside the vehicle and allow the component mirrors to be rotated as a unit about common vertical and horizontal axes to accommodate the driver's size and posture.

5 Claims, 2 Drawing Sheets

AUTOMOBILE MIRROR

BACKGROUND OF THE INVENTION

1. Field of the Invention

This invention relates to rear view mirrors for vehicles, and more particularly to adjustable side-mounted rear view mirrors for automobiles, trucks and the like.

2. Prior Art

To operate an automobile safely, particularly in congested areas and at the high speeds commonly encountered on multi-lane highways, the ability to determine quickly and with certainty whether the adjacent lane is clear to the side and rear before making a lane change is especially important.

Internally mounted rear view mirrors have been developed which widen the driver's vision to the side and rear. However, these devices are normally positioned on or above the windshield, or on the glare shield or instrument panel, near the vehicle's center line, and the roof, roof supports and passenger compartment side walls create dangerous blind spots which can hide nearby or overtaking traffic. The conventional approach to solving this problem is to provide one or more rearwardly facing mirrors on the outside of the vehicle. For convenience these are normally mounted to the front doors near the forward edge of the driver's and front seat passenger's windows.

In most states, statutes restrict the distance objects, such as externally mounted mirrors, may project laterally from the vehicle's side. These statutes, aesthetic considerations, and structural requirements effectively limit the overall width of the exterior side-mounted mirror. This in turn, limits the breadth of the reflected field of vision.

Various side-mounted mirrors have been designed with the specific purpose in mind of providing increased visibility to the sides and rear of the vehicle. Typically these fall into several broad categories. One type employs a laterally curved convex or concave reflective surface, or two or more adjacent reflective surfaces angled with respect to one another, to increase the width of the driver's field of vision. Another utilizes an auxiliary convex reflective surface to augment the view reflected by a conventional plane surface. A third category includes means allowing the driver to change the angular relationship between adjacent reflective surfaces so as to cover selected fields of vision. Yet another type incorporates means for modifying the geometry of the reflective surface itself to enable the driver to vary the field of view.

While some of these prior art devices offer certain advantages, most of them suffer from deficiencies which limit their usefulness, and in some instances render them confusing or misleading to use. None of them is capable of furnishing the driver a reliable, undistorted broad panoramic view extending from the side to the rear of his vehicle.

SUMMARY OF THE INVENTION

Ideally, a side-mounted rear view mirror should provide the widest field of vision to the side and rear consistent with the dimensional constraints imposed by the law and applicable design criteria. It should present the driver with a clear view, as nearly unbroken as possible, and with a minimum of optical distortion. The view should be natural, that is, with reflected objects neither magnified nor diminished, and free from parallax and other confusing aberrations. For maximum utility, the mirror should be easily, quickly and accurately adjustable to accomodate to the driver's height and posture.

The principle object of this invention is to provide a mirror which offers all of these features. To achieve this result, the invention departs radically from prior art side-mounted mirrors in that, unlike those mirrors, it is not entirely external to the vehicle.

Rather, it comprises two reflective portions, one external, and one internal to the vehicle. The reflective portions are rigidly joined so that they lie in a single plane and are adjustable together about common vertical and horizontal axes. Both reflective surfaces are visible to the driver, and in combination they present a field of vision substantially wider than that of a single conventional side-mounted mirror.

The construction and operation of the invention and its numerous advantages will become apparent to the reader from the following detailed description of one of its preferred embodiments as illustrated in the accompanying set of drawings;

DETAILED DESCRIPTION

Figure 1:
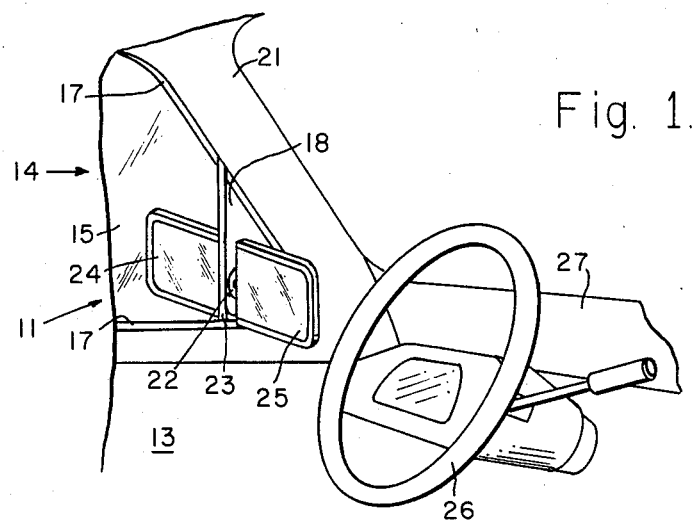
FIG. 1 is a perspective view of a mirror embodying the subject invention, shown as it appears to the driver of an automobile.

Referring to FIG. 1, a mirror 11 embodying the teachings of the subject invention is shown mounted to the driver's door 13 of an automobile. The door 13 includes a window 14 with a window glass 15 adapted to retract through a slot in window sill 17 into a compartment within the door 13.

Window 14 may be provided with a frame defining its forward, upper and rear perimeter; however, in many instances, as shown in FIG. 1, the frame is omitted. Weatherstripping 17 in the roof-supporting post and in the portion of the roof overhanging the window provides an hermetic seal with the window glass 15 when the latter is fully extended.

Commonly, the prior art external side-view mirror is mounted to the outside of the driver's or passenger's door adjacent the forward end of the window, to the forward roof-supporting post 21, or to a corner bracket 18 secured to the lower end of the forward roof supporting post 21 and the window sill 17. While the mirror of the subject invention can be mounted to the vehicle at any of these locations, it is most conveniently mounted to a corner bracket 18.

As illustrated in FIG. 1, mirror 11 comprises two reflective portions, component mirrors 24 and 25. Mounting means 22 for mirror 11 are secured to the bracket 18 as close as practicable to the rear edge 23 of the bracket 18. The mounting means 18 mount mirror 11 to the vehicle in such a manner that mirror 24 is entirely outside window 14 and mirror 25 is entirely inside window 14. It should be noted that mirror 25 is well clear of both the steering wheel 26 and the dashboard and instrument panel 27 of the automobile.

Figure 2:
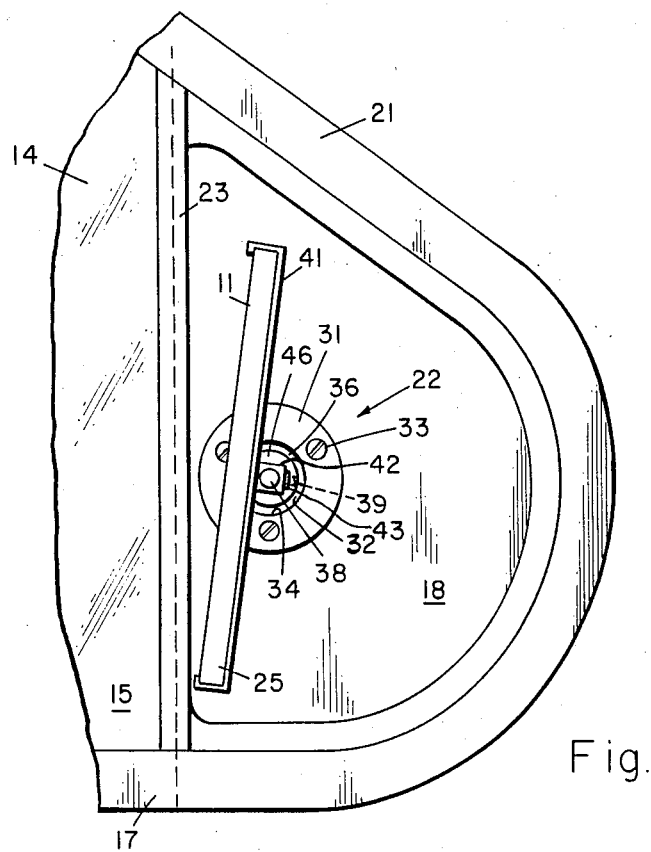
FIG. 2 is a side elevation of the mirror of FIG. 1.

FIG. 2 illustrates the positioning of component mirrors 24, 25 on bracket 18 and the relationship of mirrors 24, 25 to window glass 15 when the glass 15 is fully extended to occupy window 14.

Figure 3:
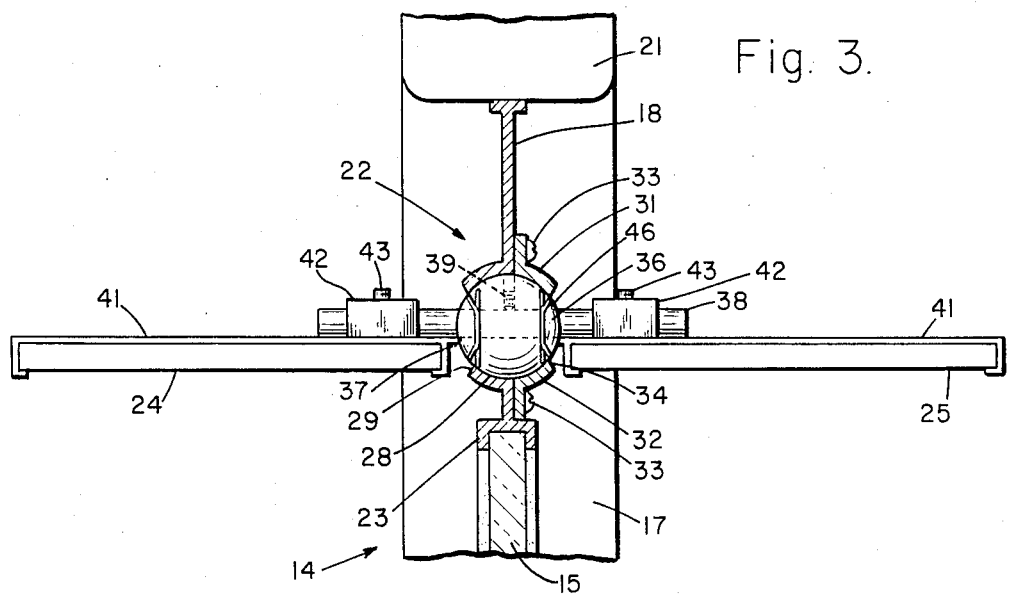
FIG. 3 is a top plan view of the mirror of FIG. 2, with portions cut away to show the means by which it is mounted to the vehicle.

FIGS. 2 and 3 show a preferred construction for mounting means 22. In this embodiment of the invention, bracket 18 is formed with a generally hemispherical outwardly extending protuberance 28. A circular opening 29 is provided in the wall of the protuberance 28. A circular cover 31, having a generally hemispherical inwardly extending protuberance 32, is adapted to be secured by means of screws 33 to the inner face of bracket 18 with protuberances 29 and 32 in registration. (It will be understood that in the interest of clarity, the terms "outwardly" and "inwardly" are used with reference to the outside and inside, respectively, of the automobile.) Protuberance 32, too, is provided with a circular opening 34 in its wall.

When cover 31 is secured to bracket 18, the protuberances 29, 32 define in a generally spherical enclosure with diametrically opposed circular openings in its wall. A ball 36, preferably of steel or other suitable non-deformable material, is sized to fit snugly, but rotatably, within this enclosure.

Ball 36 contains a bore 37 passing diametrically through it. Bore 37 is sized to receive a rigid elongated pin 38 which is fixed to ball 36 by means of a set screw 39. The ends of pin 38 extend outwardly of protuberances 28, 32 through the previously mentioned openings 29, 34.

Mirrors 24, 25 are secured, by an adhesive, or through other conventional means, to attachment plates 41 to which a pair of retainers 42 are fastened. Retainers 42 are provided with bores extending through them for receiving the ends of pin 38. Set screws 43 secure pin 38 to the retainers 41.

To mount mirror 11 to bracket 18, pin 38 is inserted in bore 37 of ball 36 and secured to ball 36 by means of set screw 39. One end of pin 38 is passed through opening 29 and ball 36 seated in protuberance 38. The other end of pin 38 is passed through opening 34 and cover 31 is fastened to bracket 18 by means of screws 33.

Normally, frictional contact between ball 36 and the inner surfaces of protuberances 28, 32 is sufficient to retain ball 36 in any selected position; however, preferably a pair of conventional friction spring washers 46 are mounted over pin 38 on opposite sides of ball 36. Spring washers 46 allow ball 36 to be rotated manually, but restrain it against random movement after it has been positioned.

Once cover 31 is fastened to bracket 18, the ends of pin 38 are inserted into the bores in retainers 42. Mirrors 24, 25 are then rotated about pin 38 until their reflective surfaces lie in a common plane, and are locked in this position by means of set screws 43. In this manner mirrors 24, 25 have effectively become a single rigid unit, mounted through ball 36 to bracket 18 with mirror 24 on the outside of window 14 and mirror 25 on the inside of window 14.

By virtue of their connection to ball 36, mirrors 24, 25 may be rotated manually about a common vertical axis and a common horizontal axis to afford the driver an unobstructed view of, and through both mirrors 24, 25. Careful selection of the various components comprising the support means and the mirror mounting means, to reduce the distance separating mirrors 24 and 25 to a minimum, can provide the driver a reflected view that is nearly unbroken as well.

It will be understood that the construction and operation of the mirror 11 just described are equally applicable to a mirror installed on the passenger side of the vehicle, the only difference being that the various components are reversed in the latter case.

Figure 4:
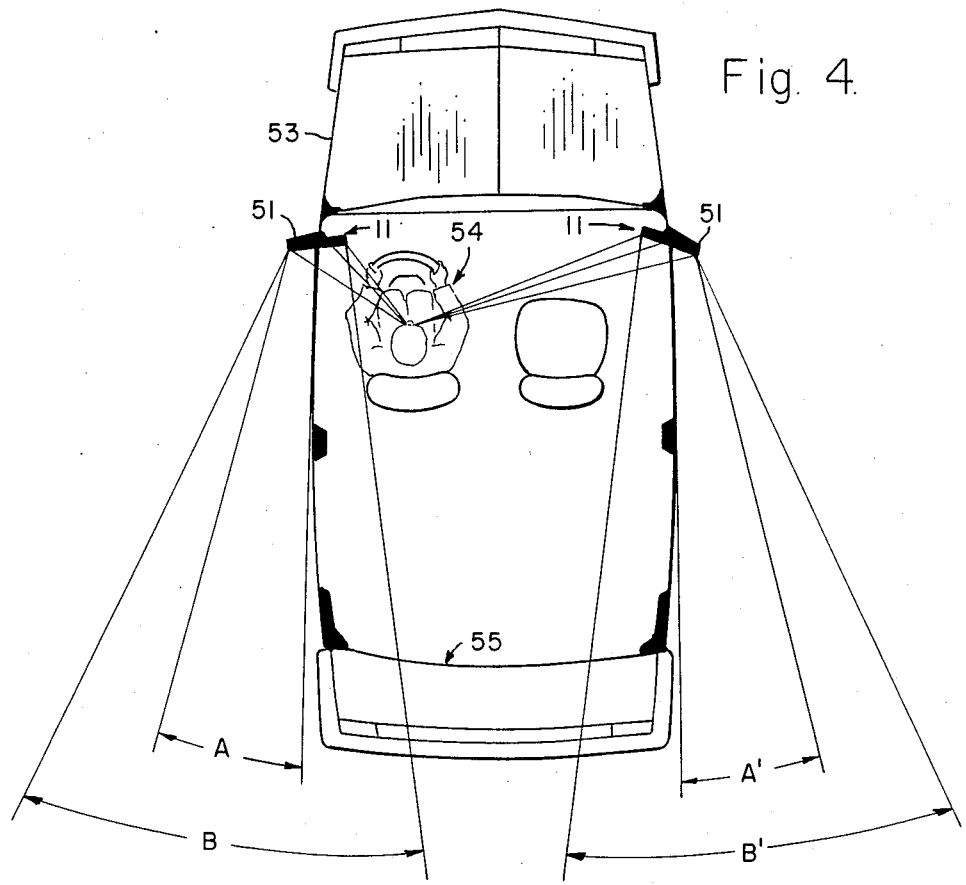
FIG. 4 is a cutaway plan view of a fanciful typical automobile, illustrating schematically the fields of vision afforded by conventional side-mounted mirrors and by mirrors embodying the subject invention.

The advantages of the mirror of the subject invention over conventional prior art external side-mounted mirrors are clearly seen FIG. 4, wherein both a pair of conventional planar mirrors 51 and a pair of mirrors 11 in accordance with this invention are shown installed on an automobile 53. The viewing angles subtended by the conventional mirrors 51 are designated by the letters A, A'. Those subtended by the subject mirrors 11 are designated by the letters B, B'.

It will be apparent that because of the substantially greater effective width of mirrors 11, while providing a view of the same area to the side and rear of the vehicle as seen in mirror 51, mirrors 11 may be oriented at a shallower angle with respect to the driver 54 than mirrors 51.

The combined effect of the additional width and the shallower mounting angle associated with mirrors 11 is to provide the driver 54 a much wider angle of vision B, B' to the side and rear of the automobile than the angle of vision A, A' covered by mirrors 51. While most of the adjacent lane on either side of the vehicle lies outside of the angle A, A', virtually the entire lane extending from the portion within the driver's peripheral vision rearward lies within the angle B, B'. In addition to the greatly enlarged area to the side of the vehicle, angle B, B' includes a considerable portion of the area directly behind the vehicle as well. This area is seen by the driver through the vehicle's rear window 55.

While I have described the invention in terms of several preferred embodiments, it is not to be construed as limited to those embodiments, and they are to be regarded as illustrative rather than restrictive. It is my intention by this specification to cover any and all variations of the examples I have chosen for purposes of the disclosure, which do not depart from the spirit and scope of the following claims.

I claim:

1. A side-mounted rear view mirror assembly for a vehicle having a side window, comprising:
    a first mirror;
    a second mirror;
    support means rigidly joining said first and second mirrors in adjacent side-by-side relationship in a common plane; and
    mounting means, located intermediate said mirrors, for rotatably mounting said support means for universal rotation of said mirrors as a unit in said window with said first mirror positioned exteriorly of said window and said second mirror positioned interiorly of said window, whereby said first and second mirrors are simultaneously visible to a driver in the vehicle and provide a single, substantially unbroken reflected panoramic view of the area extending to the side and rear of the vehicle to said driver.

2. The side-mounted rear view mirror assembly of claim 1, comprising:
    a rigid supporting member fastened to both of said mirrors;
    a ball fixed to said rigid supporting member;
    a bracket adapted to be secured in said window; and means for rotatably mounting said ball to said bracket.

3. The side-mounted rear view mirror assembly of claim 2, comprising:
a rigid elongated pin;
an attachment plate secured to each of said mirrors;
a retainer secured to each of said attachment plates, each of said retainers having a bore therein for receiving one end of said pin and having means for fixing said retainer to said pin;
a ball having a bore therethrough for receiving said pin;
means for fixing said pin to said ball; and
a socket on said bracket, adapted for receiving said ball.

4. The side-mounted rear view mirror assembly of claim 3, comprising:
a first protuberance formed in said bracket and having an opening in the wall thereof;
a cover having a second protuberance formed therein, said second protuberance having an opening in the wall thereof; and
means for connecting said cover to said bracket, whereby said first and second protuberances define a socket adapted for receiving said ball.

5. In combination with a vehicle having a side window, a side-mounted rear view mirror assembly, said mirror assembly comprising:
a first mirror;
a second mirror;
support means rigidly joining said first and second mirrors in side-by-side relationship in a common plane; and
mounting means, located intermediate said mirrors, for mounting said support means for universal rotation of said mirrors as a unit in said window with said first mirror positioned exteriorly of said window and said second mirror positioned interiorly of said window, whereby said first and second mirrors are simultaneously visible to a driver in the vehicle and provide a single, substantially unbroken reflected panoramic view of the area extending to the side and rear of the vehicle to said driver.

* * * * *